A. G. BOWEN.
UNIVERSAL JOINT.
APPLICATION FILED SEPT. 23, 1913.
1,280,651.
Patented Oct. 8, 1918.
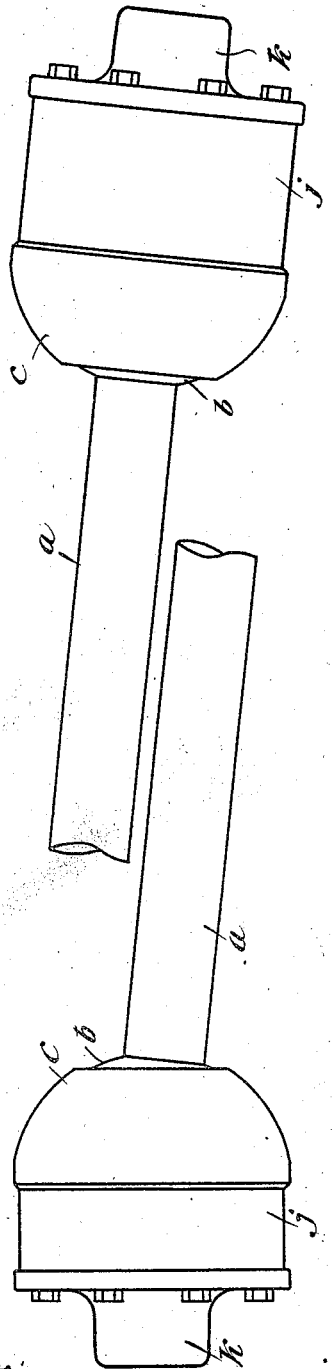
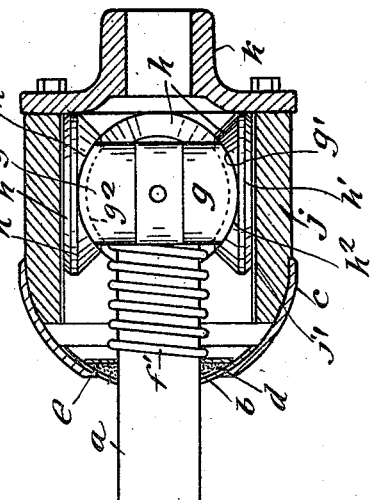
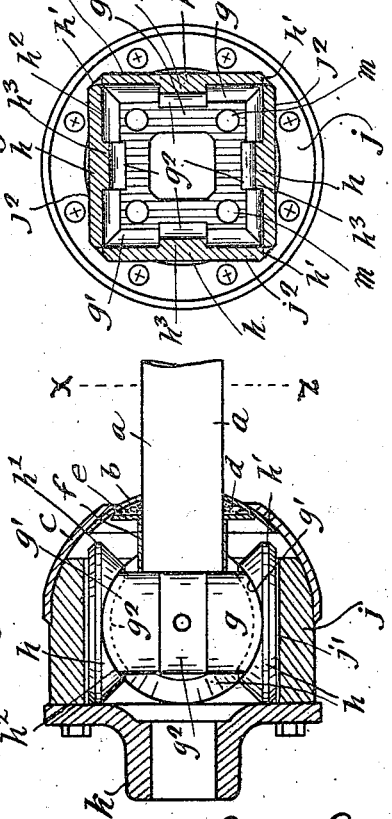

UNITED STATES PATENT OFFICE.

ADNA GUERNSEY BOWEN, OF MEDINA, NEW YORK.

UNIVERSAL JOINT.

1,280,651.　　　　　　　Specification of Letters Patent.　　Patented Oct. 8, 1918.

Application filed September 23, 1913. Serial No. 791,331.

*To all whom it may concern:*

Be it known that I, ADNA GUERNSEY BOWEN, a citizen of the United States, residing in Medina, Orleans county, New York, have invented certain new and useful Improvements in Universal Joints, of which the following is a specification.

This invention relates to improvements in universal joints, particularly to those employed for connecting the adjacent ends of driving and driven members, wherein, under some circumstances, considerable latitude of relative movement between the connected members is essential. In automobile use, it is a prime essential that the connection between the driving and the driven shaft possess the greatest possible flexibility in order that movement of one member relative to the other may be accomplished with sufficient freedom to avoid binding and undue friction in the joint.

The object of the present invention is the provision of a universal joint which is especially adapted for automobile use, and which possesses the necessary requirements of extreme flexibility, an equal distribution of the load, and the capacity for more perfect lubrication than has been previously attained. In a universal joint constructed in accordance with this invention a greater latitude of bearing surface is provided, which possesses the additional capacity of wearing evenly, a distinct advantage since the tendency to bind and the production of excessive friction is thereby reduced to a minimum.

A full understanding of the nature and objects of the invention will be attained from the ensuing detailed description of a construction embodying the same in a preferred form, when taken in connection with the accompanying drawing.

In the drawing:

Figures 1 and 2 indicate a side elevation of a pair of universal joints made in accordance with the present invention, the joints being shown as arranged in a manner common to motor vehicles.

Fig. 3 is a longitudinal section of one type of universal joint embodying the present improvements;

Fig. 4 is a transverse section of the type shown in Fig. 3;

Fig. 5 is a longitudinal section of another type of universal joint.

The improved joint by which the adjacent ends of two shafts are connected includes a shaft coupling member, or transmission unit, preferably in the form of a shield $j$. Secured to one end of said shield, in any suitable manner, is a flange $k$ which is adapted to be attached to a shaft (not shown) and is illustrated as centrally apertured for this purpose. A shaft attached to the flange $k$ may be either a driving or driven shaft, and will be readily understood as extending outwardly from the said flange $k$, in a manner well known in the art. The shield $j$ which forms one member of the universal joint is provided with a bearing socket $j'$, the surrounding wall of which is formed with a series of internal plane bearing faces all parallel with the longitudinal axis of the socket or shaft and adjacent plane faces of the socket disposed at an angle to each other. The socket is adapted to receive the bearing head $g$ which forms the other member of the universal joint and is mounted on the end of the shaft $a$. In the preferred construction, the bearing socket $j'$ is substantially rectangular in cross-section, the inner flat faces $j^2$ operating as frictional bearing surfaces, for purposes which will presently appear. The bearing head $g$ is also preferably substantially rectangular in cross-section, and each one of its side friction faces $g'$ is made cylindrical or curvilinear in shape to frictionally engage corresponding concave semi-cylindrical faces $h^2$ provided in bearing saddles $h$. These bearing saddles are preferably the same in number as the friction faces $g'$ of the bearing block and are shown as being substantially in the form of truncated cones interposed between the bearing block on each of its sides, and the walls of the bearing socket, with the bases $h'$ of the cones forming flat bearing surfaces in frictional contact with the flat inner faces $j^2$ of the bearing socket. From the foregoing it will appear that when the parts of the universal joint are assembled in working order, the bearing surface of the head $g$ is completely surrounded by the saddles, and these, in turn, frictionally engage approximately the entire bearing surface of the socket. It will be noted that the circular edges of the saddles may engage the inner transverse wall of the socket without interfering with the movement of the saddles on their own axes. This construction is a distinct advantage in practice, because, in addition to the increased area of bearing surface provided, the entire structure is exceedingly compact with a very small percentage of empty space within the socket so that any danger of uneven wear of the surfaces is reduced to a minimum.

Each bearing saddle $h$ is provided on its concave surface $h^2$ with a rib or spline $h^3$ which fits into a corresponding groove $g^2$ in a curvilinear face of the bearing block $g$. Such a construction permits rotation or movement of the bearing head $g$ relative to the saddle in one direction and causes the saddle to rotate or move with the bearing block relative to the side wall of the bearing shield in another direction. It will appear from the arrangement of the saddles, as shown in Fig. 4, that a universal movement of the shaft $a$ will cause the head to move on its axis relatively to the saddles which are disposed in planes at angles to the plane of movement of the shaft $a$, whereas the saddles in the plane of movement of said shaft will move in unison with the head. In other words, assuming that the universal movement of the shaft $a$ commences in a direction substantially the same as that indicated by the lines $x, z$, the movement being from the point $x$ to the point $z$, the top and bottom saddles $h$ have no movement, whereas the side saddles would move with the bearing head relatively to frictionally engaged walls of the shield. When the direction of movement of the shaft $a$ is shifted, for instance, in a direction perpendicular to the line of movement indicated by the line $x, z$, the top and bottom saddles will now move with the bearing head and the two side saddles will be stationary, the friction surfaces of the bearing head moving against the concave surfaces of the side saddles. It will be noted that the spline and groove construction holds the head and saddles against relative movement longitudinally of the axes of the cylindrical faces of said head and saddles, without any additional support.

While it is possible to form the splines on the bearing head and the grooves in the saddles without departing from the spirit and scope of the invention, it is preferable that the arrangement shown and above described be preserved. By providing the splines or ribs on the concave surface of the saddles, the saddles are strengthened materially and enabled to take up without danger the constant swaging effect of the bearing head. It will be understood that as the saddles are somewhat thin in cross section, particularly at the center of the concave surface it is very desirable that they be strengthened as much as possible. Otherwise under bearing strains there would be some liability of the saddles snapping in half.

The arrangement of the bearing head and saddles within the socket is such as to cause the centrifugal force arising from the operation of the joint to throw a lubricant against the bearing surfaces instead of the usual tendency in devices of this character to scatter the lubricant away from said surfaces. To additionally guard against waste of lubricant the shield is provided at its end adjacent to the shaft $a$ with a shell or casing $c$ having a central opening considerably greater than the diameter of the shaft $a$ to admit of free oscillation thereof. The shaft $a$ is provided with a smaller shield $b$ which is movable with the shaft and positively held in frictional contact with the inner surface of the larger shield $c$, as shown in Fig. 3. Positive frictional contact of shield $b$ with shell $c$ may be effected by providing a section of tubing $f$ which bears against a washer $e$. The washer $e$ presses a packing $d$ against the inner surface of the smaller shield $b$ thus affording a very tight joint and preventing escape of lubricant. In the construction shown in Fig. 5 substantially the same result is accomplished by substituting for the tubing $f$ a spring $f'$. The spring $f'$ enables the shaft $a$ to move longitudinally with respect to the bearing shell, thus forming in effect a slip joint. Any displacement of the lubricant due to centrifugal force will tend to throw it against the inner surface of the shell $c$ which directs it back against the bearing surface so that the improved universal joint is under all conditions flooded with lubricant, a condition most favorable to exceedingly efficient operation. To permit free circulation of lubricant and air throughout the joint, oil holes or ducts $m$ are provided in the bearing head $g$. These preferably extend longitudinally through the head, and assist in keeping all of the working surfaces flooded with oil. The bearing head $g$ is preferably detachable from the shaft $a$ in order to permit ready assemblage of the parts within the socket.

While I have shown and described a specific embodiment of my invention, it will be understood that the same is not to be limited to the details of construction, but on the contrary is capable of considerable modification and variation within the scope of the appended claims.

What is claimed is:—

1. A universal joint embodying a shaft coupling member having a socket with the inner wall of the latter extending transversely of the longitudinal axis of the shaft and the surrounding wall of the socket formed with internal plane bearing faces all parallel with said axis, adjacent bearing faces being disposed at an angle to each other, a substantially circular bearing saddle for each of said bearing faces, the edges of said saddles being adapted to bear against the inner transverse wall of the socket, each saddle having a plane outer bearing face frictionally engaging one of the faces of the socket, and a concavo semi-cylindrical inner bearing face, a shaft having a head received within the socket, said head having a plurality of semi-cylindrical lateral bearing faces seating respectively in the inner bearing faces of the saddles, interlocking splines and grooves on the coöperating saddles and cylindrical faces of the head, extending in planes at right angles to the axes of the cylindrical faces of the head, whereby said saddles are held against relative movement longitudinally of said axes, and means for yieldingly urging said saddles into bearing contact with the inner transverse wall of the socket.

2. A universal joint embodying a shaft coupling member having a socket with the inner wall of the latter extending transversely of the longitudinal axis of the shaft and the surrounding wall of the socket formed with internal plane bearing faces all parallel with said axis, adjacent bearing faces being disposed at an angle to each other, a substantially circular bearing saddle for each of said bearing faces, the edges of said saddles being adapted to bear against the inner transverse wall of the socket, each saddle having a plane outer bearing face frictionally engaging one of the faces of the socket and a concavo semi-cylindrical inner bearing face, an inclosing shell at the open end of the socket, a shaft extending through the shell and having a head, received within the socket, said head having a plurality of semi-cylindrical lateral bearing faces seating respectively in the inner bearing faces of the saddles, and an elastic member interposed between said shell and head and yieldingly urging said head and saddles inwardly in the socket to maintain the saddles normally in bearing contact with the inner transverse wall of the socket.

In testimony whereof I have affixed my signature in the presence of two witnesses.

ADNA GUERNSEY BOWEN.

Witnesses:
ABIEL BOWEN,
HELEN C. G. BOWEN.